(12) United States Patent
Schmidt et al.

(10) Patent No.: US 6,324,888 B1
(45) Date of Patent: Dec. 4, 2001

(54) AUXILIARY HOUSING FOR HOLDING A DISTANCE MEASURING DEVICE

(75) Inventors: Dierk Schmidt; Juergen Luginsland, both of Leinfelden-Echterdingen; Joerg Stierle, Waldenbuch; Peter Wolf, Leinfelden-Echterdingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/262,371

(22) Filed: Mar. 3, 1999

(30) Foreign Application Priority Data

Mar. 6, 1998 (DE) .............................. 198 09 683

(51) Int. Cl.$^7$ ...................................... G01C 3/08
(52) U.S. Cl. ............................................. 73/1.79
(58) Field of Search ..................... 73/1.79, 1.81, 73/431, 866.5, 597; 324/207.24; 356/5.01, 5.09, 5.1, 243, 247; 33/712, 572; 367/13, 118

(56) References Cited

U.S. PATENT DOCUMENTS 4,470,664 * 9/1984 Shirasawa .

* cited by examiner

*Primary Examiner*—Robert Raevis
(74) *Attorney, Agent, or Firm*—Michael J. Striker

(57) ABSTRACT

An auxiliary housing for holding a distance measuring device has a housing part which forms a receptacle for insertion of the distance measuring device, a threaded bushing for mounting the housing part on a tripod, the threaded bushing having a longitudinal axis which coincides with an abutment surface operating as a reference surface for a hand-guided measuring process when the distance measuring device is inserted in the housing part.

12 Claims, 2 Drawing Sheets

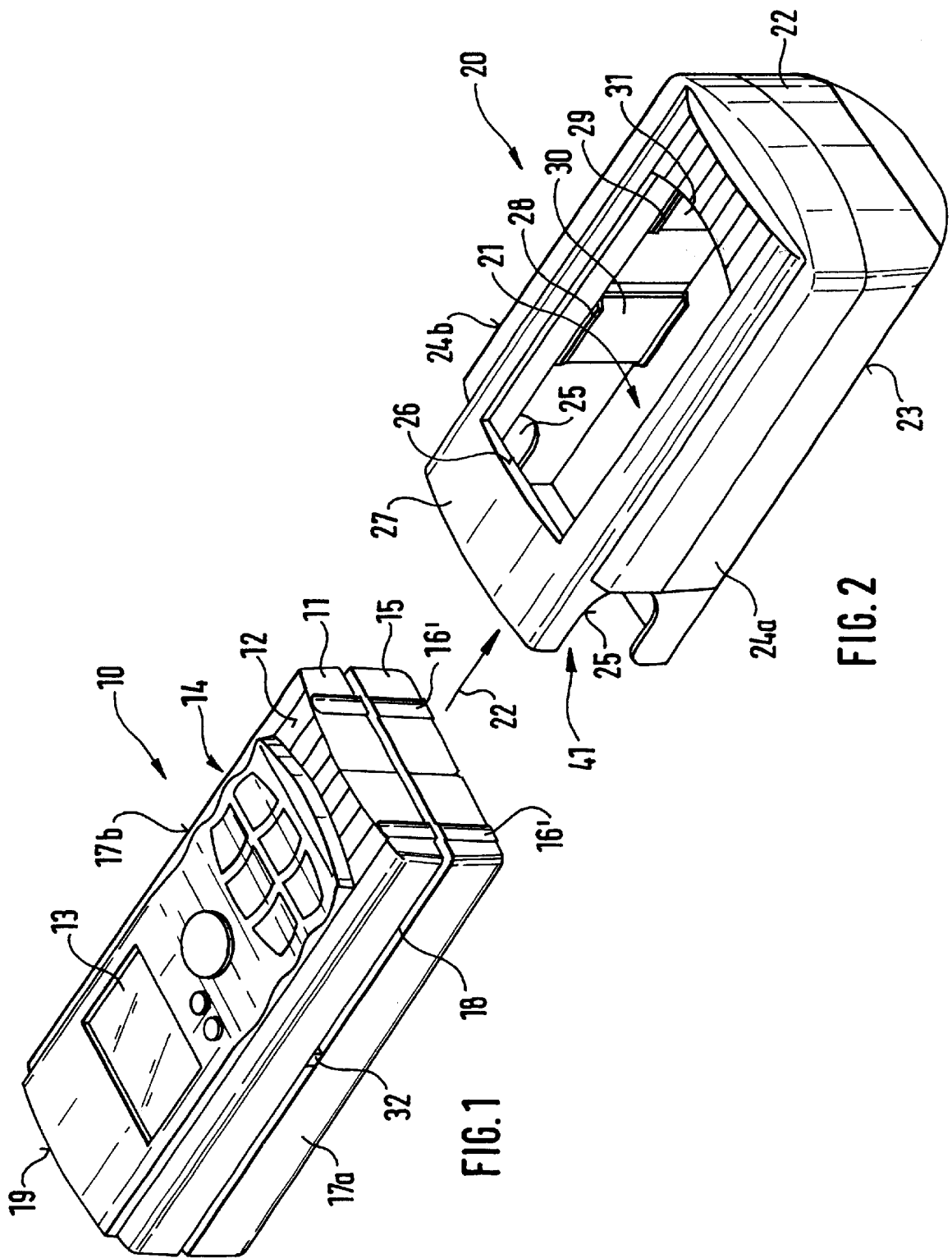

AUXILIARY HOUSING FOR HOLDING A DISTANCE MEASURING DEVICE

BACKGROUND OF THE INVENTION

The present invention relates to an auxiliary housing for holding a distance measuring device.

It is known that in order to supply hand-held distance measuring devices, such as for example ultrasound distance measuring devices and laser distance measuring devices in protective bags, it is necessary to protect the devices from damages during transportation and storage. It is also known to integrate threaded bushings in the device housing of the distance measuring devices, which serve for mounting on a tripod. For the use on a tripod, in the known devices the reference point for the distance measurement must be compensated by a correction calculation. If such a compensation is forgotten, the measuring results are inaccurate.

SUMMARY OF THE INVENTION

Accordingly, it is an object of the present invention to provide an auxiliary housing for holding a distance measuring device, which avoids the disadvantages of the prior art.

In keeping with these objects and with others which will become apparent herein after, one feature of present invention resides, briefly stated, in an auxiliary housing for holding a distance measuring device with a receptacle in which the distance measuring device is insertable and with a threaded bushing for mounting of the auxiliary housing on a tripod, wherein the threaded bushing has a longitudinal axis which, when the distance measuring device is inserted in the auxiliary housing, coincides with an abutment plane which is provided at the side of the device and serves as a reference plane for the hand-guided measuring process.

When the auxiliary housing is designed in accordance with the present invention, it has the advantage that in a simple manner a tripod operation with distance measuring devices is possible.

Since the longitudinal axis of the tripod threaded bushing coincides with a device-side reference plane for the measuring process when the distance measuring device is inserted in the auxiliary housing, the tripod operation can be performed with the same reference plane as the hand operation.

In view of the fact that the rotary axis and the reference plane coincide with one another, a doubling of the measuring region can be provided by simple turning of the device by 180°, without the necessity of performing a compensation.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a distance measuring device to be held in an inventive auxiliary housing;

FIG. 2 is a perspective view of an auxiliary housing for the distance measuring device of FIG. 1, in accordance with the present invention.

DESCRIPTION OF PREFERRED EMBODIMENTS

Figure 3:
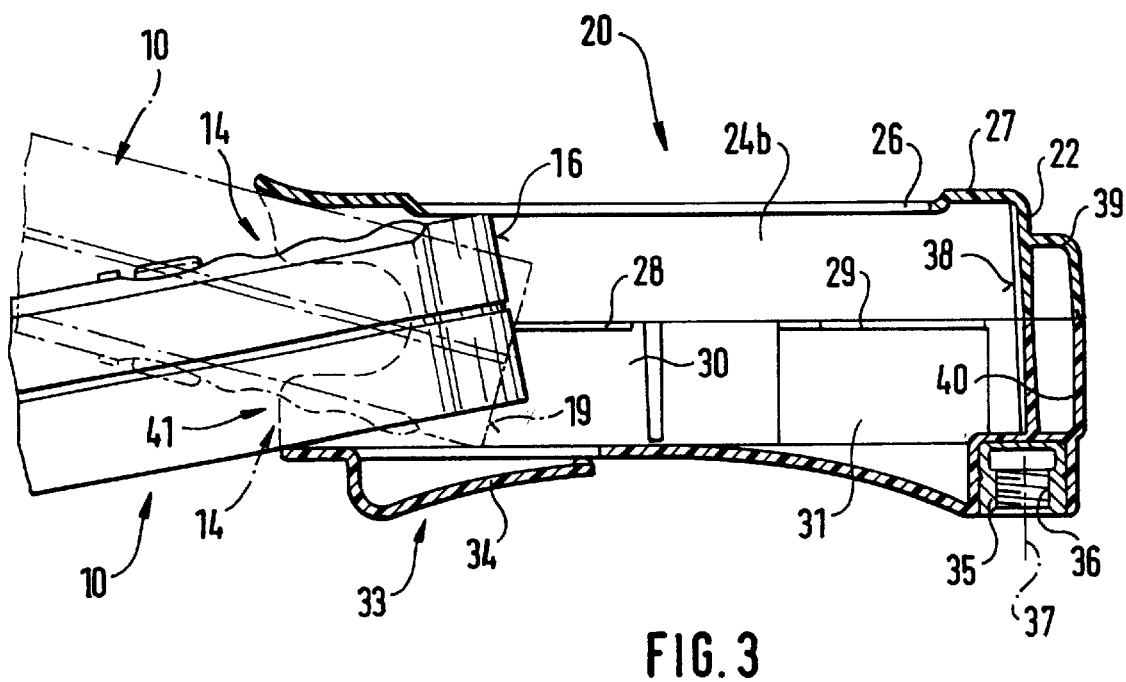
FIG. 3 is a longitudinal section through the inventive auxiliary housing.

A distance measuring device is shown in FIG. 1 and identified with reference numeral 10. It has a device housing 11. An indicating device 13 and several operating buttons 14 are located on the upper side 12 of the distance measuring device 10. A rear side 15 of the distance measuring device 10 is provided with two parallel strips 16' for abutment of the housing 11 against an object, from which the distance to a measuring object must be determined. The strips 16' form an abutment plane 16 which serves as reference plane for the measuring process.

A guiding groove 18 is formed on two side surfaces 17a, 17b of the housing 11 and extends in a longitudinal direction. An outlet opening for a measuring signal which is not shown in the drawings is located on a front side 19 of the distance measuring device 10.

An auxiliary housing for the distance measuring device 10 is identified with reference numeral 20 in FIG. 2. It has a receptacle 21 for insertion and fixing of the distance measuring device 10. The auxiliary housing 20 is formed as a hollow body with a bottom wall 23, a housing wall 27 located opposite to the bottom wall 23, a rear wall 22 connecting the bottom wall 23 with the housing wall 27, and side walls 24a, 24b. The walls 22, 23, 24a, 24b, 27 are formed of a solid, resistant synthetic plastic material and form a housing box for the distance measuring device 10.

The auxiliary housing 20 has an insertion opening 41 formed for insertion of the distance measuring device 10 in direction of an arrow 22. The side walls 24a, 24b are provided in the region of the insertion opening 41 with a recesses 25 which extend in the insertion direction 22. Thereby the withdrawal of the distance measuring device 10 inserted in the auxiliary housing 10 is facilitated.

A window-shaped passage 26 in the housing wall 27 is formed for reading the indicating device 13 as well as for operating the operating buttons 14 when the distance measuring device 10 is inserted. On the side surfaces 24a, 24b, inwardly projecting strips 28, 29 are formed on springy tongues 30, 31. The tongues 30, 31 are partially separated from the side walls 24a, 24b so that they can be pressed outwardly due to their pretensioning. The strips 28, 29 are formed for engagement in the guiding grooves 18 of the distance measuring device 10. Arresting caps 32 are provided in the guiding grooves 18 so that the strips 28, 29 are snapped in the guiding grooves 18 before them. Thereby the distance measuring device is protected in the auxiliary housing from falling out.

The auxiliary housing 20 is shown in section in FIG. 3. This Figure clearly shows the housing wall 27 with the passage 26 formed in it, as well as with the insertion opening 41. Guiding strips 28, 29 on the tongues 30, 31 are clearly recognizable on the inner wall of the side wall 24b. The insertion opening 41 is formed so that the distance measuring device 10 is insertable through a broad tilting angle region. In the lower insertion position shown in FIG. 3, the distance measuring device 10 is partially inserted in the use position with the upwardly located operating buttons 14. In an upper insertion position, the distance measuring device 10 to the contrary is partially inserted with the downwardly located operational buttons 14. In the last position, after the complete insertion a transportation protection for the distance measuring device 10 is obtained, since the front side 19 of the distance measuring device 10 then extend into the interior of the housing box and thereby the outlet opening for the measuring signal is protected by the rear wall 22.

A supporting lip 33 is formed on the bottom wall 23 of the auxiliary housing 20. It has a clamping bracket 34 which freely projects in the insertion direction 22 of the distance measuring device 10 and is prestressed inwardly. With the supporting clip 33, the auxiliary housing 20 can be mounted for example on a belt of the user. The auxiliary housing 20 is assembled of an upper housing shell 39 and a lower housing shell 40.

A threaded bushing 35 is arranged on the bottom wall 23. It is used for mounting of the auxiliary housing 20 on a not shown tripod. The threaded bushing 35 has an inner thread 36 with a longitudinal axis 37, which is located in an inner abutment plane 38 for the distance measuring device 10. The strips 16' of the distance measuring device 10 come to abutment against the abutment surface 38 after the insertion, so that the longitudinal axis 37 and the abutment plane 16 coincide with one another for the hand-guided measuring process. During the measurements with the support on the tripod, the same reference plane can be used as in the handguided measurements, so that the compensation calculations are not needed.

It will be understood that each of the elements described above, or two or more together, may also find a useful application in other types of constructions differing from the types described above.

While the invention has been illustrated and described as embodied in auxiliary housing for holding a distance measuring device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. An auxiliary housing for holding a distance measuring device, comprising a housing part which forms a receptacle for insertion of the distance measuring device; a threaded bushing for mounting said housing part on a tripod, said threaded bushing having a longitudinal axis which coincides, when the distance measuring device is inserted in said housing part, with an abutment plane of the measuring device operating as a reference surface for a hand-guided measuring process.

2. An auxiliary housing as defined in claim 1, wherein said housing part has an inner abutment surface, against which said first mentioned abutment surface abuts when the distance measuring device is inserted.

3. An auxiliary housing as defined in claim 1, wherein said housing part forms a housing box having a bottom wall, a housing wall which is opposite to said bottom wall, two side walls, a rear wall connecting said bottom wall with said housing wall and side walls.

4. An auxiliary housing as defined in claim 3, wherein said threaded bushing is inserted in a region of said rear wall into said bottom wall.

5. An auxiliary housing as defined in claim 3, wherein said side walls have inwardly projecting guiding strips which form said receptacle and are engageable with guiding grooves provided in the distance-measuring device.

6. An auxiliary housing as defined in claim 5, wherein said guiding strips are formed on springy tongues formed by said side walls.

7. An auxiliary housing as defined in claim 3, wherein said housing part has an insertion opening for insertion of the distance measuring device, said side walls in a region of said insertion opening each being provided with a recess extending in an insertion direction of the distance measuring device.

8. An auxiliary housing as defined in claim 3, wherein said bottom wall has a supporting clip provided with a clamping bracket which freely projects in an insertion direction and is inwardly pre-stressed.

9. An auxiliary housing as defined in claim 1, wherein said housing part is provided with a housing wall having a window-shaped passage.

10. An auxiliary housing as defined in claim 1, wherein said receptacle is formed so that the distance measuring device is selectably insertable with a rear side rearwardly from behind and visa versa with a front side from behind in said housing part.

11. An auxiliary housing as defined in claim 1, wherein said receptacle is formed so that the distance measuring device is selectably insertable with an upper side upwardly and with the upper side downwardly into said receptacle.

12. An auxiliary housing as defined in claim 1, wherein said housing part is composed of two housing shells.

\* \* \* \* \*